US 8,834,713 B1

(12) United States Patent
Merrett (10) Patent No.: US 8,834,713 B1
(45) Date of Patent: Sep. 16, 2014

(54) INTAKE STRAINER FOR A HOSE

(76) Inventor: Stanley L. Merrett, Dadeville, AL (US)

( * ) Notice: Subject to any disclaimer, the term of this patent is extended or adjusted under 35 U.S.C. 154(b) by 792 days.

(21) Appl. No.: 13/081,715

(22) Filed: Apr. 7, 2011

(51) Int. Cl.
*B01D 35/02* (2006.01)
*B01D 35/153* (2006.01)
*A62C 33/00* (2006.01)

(52) U.S. Cl.
CPC .............. *B01D 35/153* (2013.01); *B01D 35/02* (2013.01); *A62C 33/00* (2013.01); *B01D 2201/44* (2013.01)
USPC ........... 210/117; 210/123; 210/250; 210/238; 210/460

(58) Field of Classification Search
None
See application file for complete search history.

(56) References Cited

U.S. PATENT DOCUMENTS

| | | | | |
|---|---|---|---|---|
| 1,837,901 | A | * | 12/1931 | Fottinger et al. ............... 244/130 |
| 2,303,808 | A | * | 12/1942 | Wolcott ......................... 210/119 |
| 2,318,220 | A | | 5/1943 | Haselwood |
| 2,503,455 | A | | 4/1950 | Sheren |
| 2,597,728 | A | * | 5/1952 | Hink .............................. 210/119 |
| 2,732,071 | A | | 1/1956 | Crow |
| 3,132,364 | A | * | 5/1964 | Oxley ............................. 15/1.7 |
| 3,206,036 | A | | 9/1965 | Hawley |
| 3,613,894 | A | | 10/1971 | Ciegg, Jr. |
| 4,129,503 | A | * | 12/1978 | Joseph .......................... 210/232 |
| 4,179,379 | A | | 12/1979 | Mitchell |
| 4,310,423 | A | * | 1/1982 | Brown et al. ................. 210/791 |
| 4,357,238 | A | | 11/1982 | Ziaylek, Jr. |
| 4,647,374 | A | | 3/1987 | Ziaylek |
| 4,973,403 | A | | 11/1990 | Kozey |
| 5,082,013 | A | | 1/1992 | Scheib |
| 5,158,673 | A | | 10/1992 | Halter |
| 6,949,198 | B2 | | 9/2005 | Reber |
| 2010/0059432 | A1 | | 3/2010 | Kozey |

OTHER PUBLICATIONS http://www.fol-da-tank.com/; Fol-Da-Tank; Jan. 28, 2011.
http://www.kochek.com/FireEquipment/default.aspx; Kocheck Co, Inc.; Jan. 28, 2011.
http://www.ziamatic.com/; Ziamatic Corp.; Jan. 28, 2011.
http://www.redheadbrass.com/; Red Head Brass, LLC.; Jan. 28, 2011.
http://www.actioncoupling.com/; Action Coupling & Equipment, Inc.; Jan. 28, 2011.
http://www.huskyportable.com/index/php; Husky Portable Containment; Jan. 28, 2011.
http://www.clampco.com/; Clampco Products, Inc.; Jan. 28, 2011.

* cited by examiner

Primary Examiner — Terry Cecil
(74) Attorney, Agent, or Firm — Neustel Law Offices (57) ABSTRACT

An intake strainer for establishing a sufficient water supply to a suction hose. The intake strainer includes a triangular-shaped body having an elongated bottom, a screened intake, and foot members extending from the body for elevating the intake. The body also includes interior guide vanes angled from the intake towards a central opening of the body to form water-receiving channels. Optional low water-level control blades may also be used with the intake. Extending from the side opening of the body is an outlet member which serves to fluidly connect to a hose, such as a fire hose, or a threaded coupler which would in turn connect to a threaded part of the fire hose. The strainer may be attached to a support plate for being affixed to a supporting frame of the holding tank or alternately may be used in a skimmer assembly and/or be attached to a flotation member.

18 Claims, 10 Drawing Sheets

FIG. 10b

INTAKE STRAINER FOR A HOSE

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to an intake strainer and more specifically it relates to an intake strainer for a hose for establishing a sufficient water supply to the fire hose from the water holding tank.

2. Description of the Related Art

Any discussion of the related art throughout the specification should in no way be considered as an admission that such related art is widely known or forms part of common general knowledge in the field.

When fighting fires away from a pressurized source, such as a city water system, it is often necessary for the fire department to transport water to the fire scene using large tanker trucks. The transported water is then dumped into one or more portable holding tanks located at the fire scene, where the water is commonly retrieved by an attending fire engine with a pump. Water enters the Fire Engine Pump via a rigid suction hose having an intake strainer attached to the end of the fire hose. The strainer, generally referred to as a low level strainer, and hose are generally placed over the sidewall of the holding tank to be in contact with the stored water.

The strainers are not optimal for various reasons, such as being awkward to maneuver, and being not supported by the frame such as which permits for a non stable strainer or provides for a strainer putting too much stress on the sidewall of the holding tank. In addition, the strainers can cause whirlpooling of the water which slows a suction of the water into the hose, among having other deficiencies. Because of the inherent problems with the related art, there is a need for a new and improved intake strainer for a hose for establishing a sufficient water supply to the fire hose from the water holding tank.

BRIEF SUMMARY OF THE INVENTION

A system for establishing a sufficient water supply to the fire hose from the water holding tank. The invention generally relates to an intake strainer which includes a body having an elongated bottom, an intake having a plurality of openings extending along the elongated bottom, and a plurality of foot members extending from the body for elevating the intake above the floor of a water holding tank, wherein the strainer is submersed in the holding tank. The body also includes a plurality of guide vanes being angled from the intake towards a central opening along a front side of the body. The guide vanes define channels, wherein each of the channels are preferably a similar width via the guide vanes being spaced evenly along the length of the bottom of the body. Extending from the side opening of the body is an outlet member which serves to fluidly connect to a hose, such as a fire hose, or a threaded coupler which would in turn connect to a threaded part of the fire hose. The strainer may also be attached to a support plate for being affixed to a supporting frame of the holding tank so as to alleviate strain upon the fabric or flexible walls of the holding tank. In other embodiments and applications, the strainer may be arranged in a skimmer structure and/or be attached to a flotation member.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 10$a$ is a sectional view of the control blades illustrated in FIG. 9 with the blades in the closed position due to low water level.

FIG. 10$b$ is a sectional view of the control blades illustrated in FIG. 9 with the blades in the open position due to high water level.

DETAILED DESCRIPTION OF THE INVENTION

A. Overview.

Turning now descriptively to the drawings, in which similar reference characters denote similar elements throughout the several views, FIGS. 1 through 10$b$ illustrate an intake strainer for a hose 10, which comprises a body 20 having an elongated bottom, an intake 40 having a plurality of openings 41 extending along the elongated bottom, and a plurality of foot members 37 extending from the body 20 for elevating the intake 40 above the floor of a water holding tank 70, wherein the strainer 10 is submersed in the holding tank 70. The body 20 also includes a plurality of guide vanes 30 being angled from the intake 40 towards a central opening 24 along a front wall 22 of the body 20. The guide vanes 30 define channels 34, wherein each of the channels 34 are preferably a similar width via the guide vanes 30 being spaced evenly along the length of the bottom of the body 20. Extending from the opening 24 of the body 20 is an outlet member 50 which serves to fluidly connect to a hose 67, such as a fire hose, or a threaded coupler 64 which would in turn connect to a threaded part of the fire hose 67.

The strainer 10 may also be attached to a support plate 60 for being affixed to a supporting frame 73 of the holding tank 70 so as to alleviate strain upon the fabric or flexible sidewalls 71 of the holding tank 70. In other embodiments and applications, the strainer 10 may be arranged in a skimmer assembly 80 and/or be attached to a flotation member 90.

B. Strainer.

Figure 6:
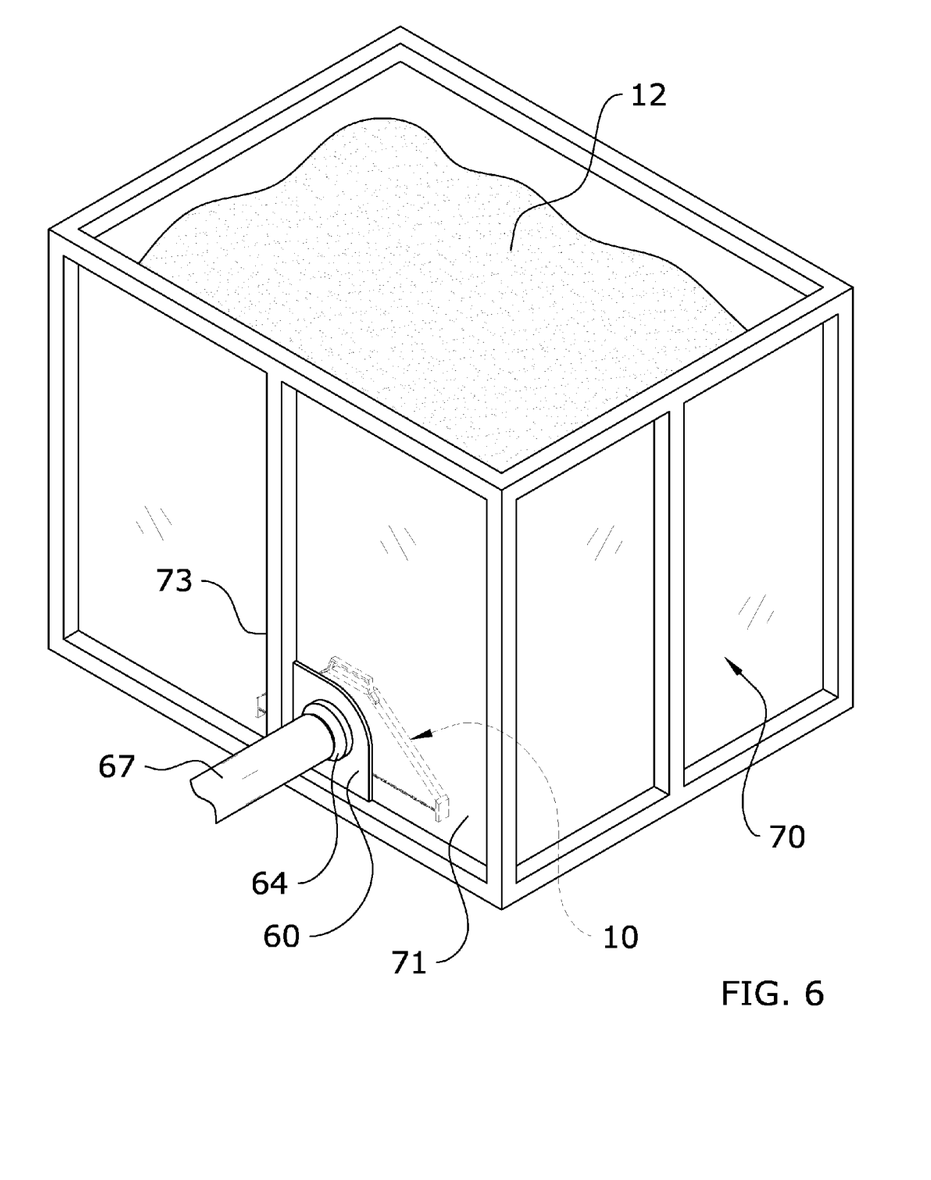
FIG. 6 is an upper perspective view of the strainer submerged in a holding tank and attached thereto.
Figure 7:
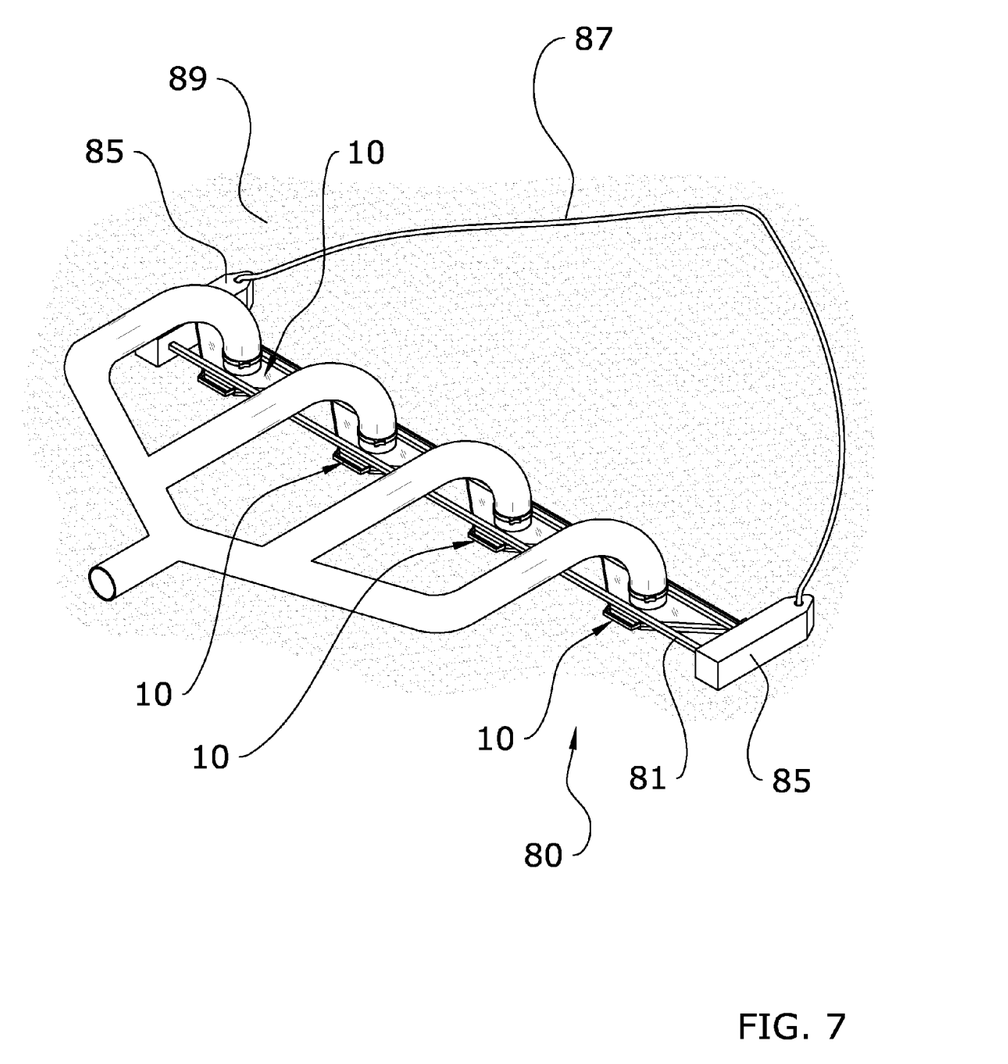
FIG. 7 is an upper perspective view of the strainer being used as a skimmer.
Figure 8:
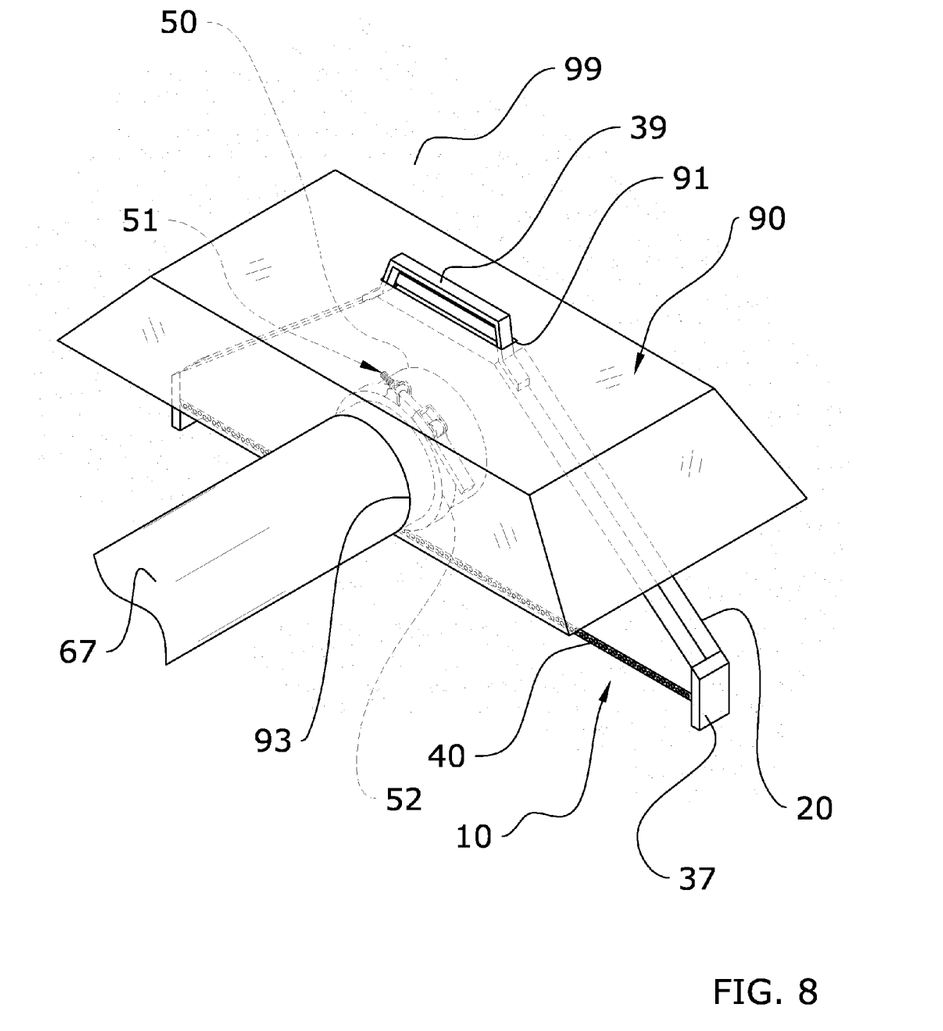
FIG. 8 is an upper perspective view of the strainer having a flotation member attached thereto.
Figure 9:
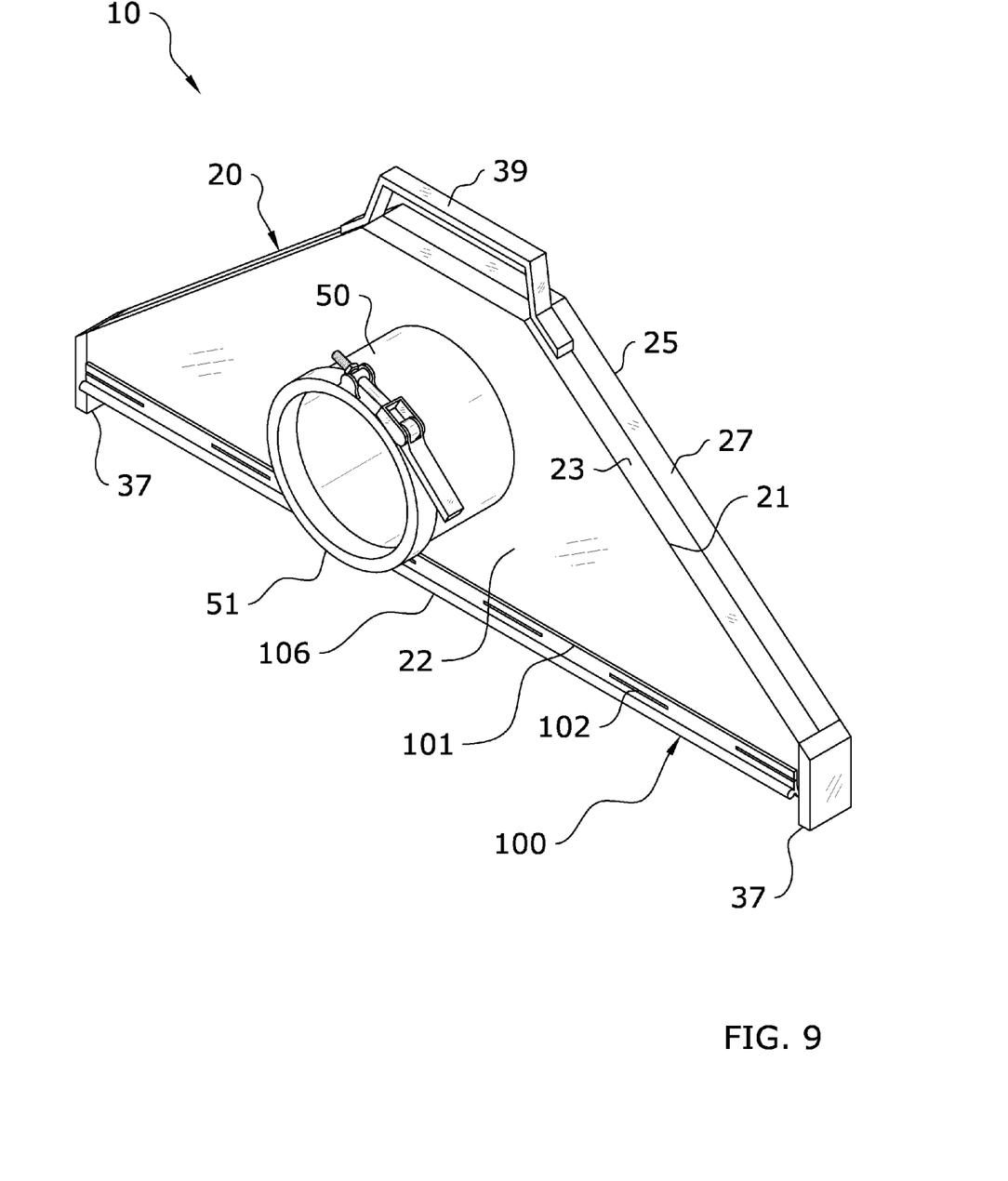
FIG. 9 is an upper perspective view of the strainer having low-flow control blades.

In the preferred embodiment, the thin strainer 10 is attached to a suction hose 67 and is used at a fire scene for transferring water 12 from a holding tank 70 to a fire engine, wherein the water 12 is then used in a conventional manner to extinguish the fire. As will be described the strainer 10 may be used in various alternate applications, such as being used for a skimmer along various bodies of water 12 to collect substances, such as oil, along the surface of the water 12 as illustrated in FIG. 7. The strainer 10 is generally submersed during use as illustrated in FIG. 6; however it is appreciated that the strainer 10 may be retained upon the surface of the water 12 such as through one or more flotation members 90 as illustrated in FIG. 8.

Figure 2:
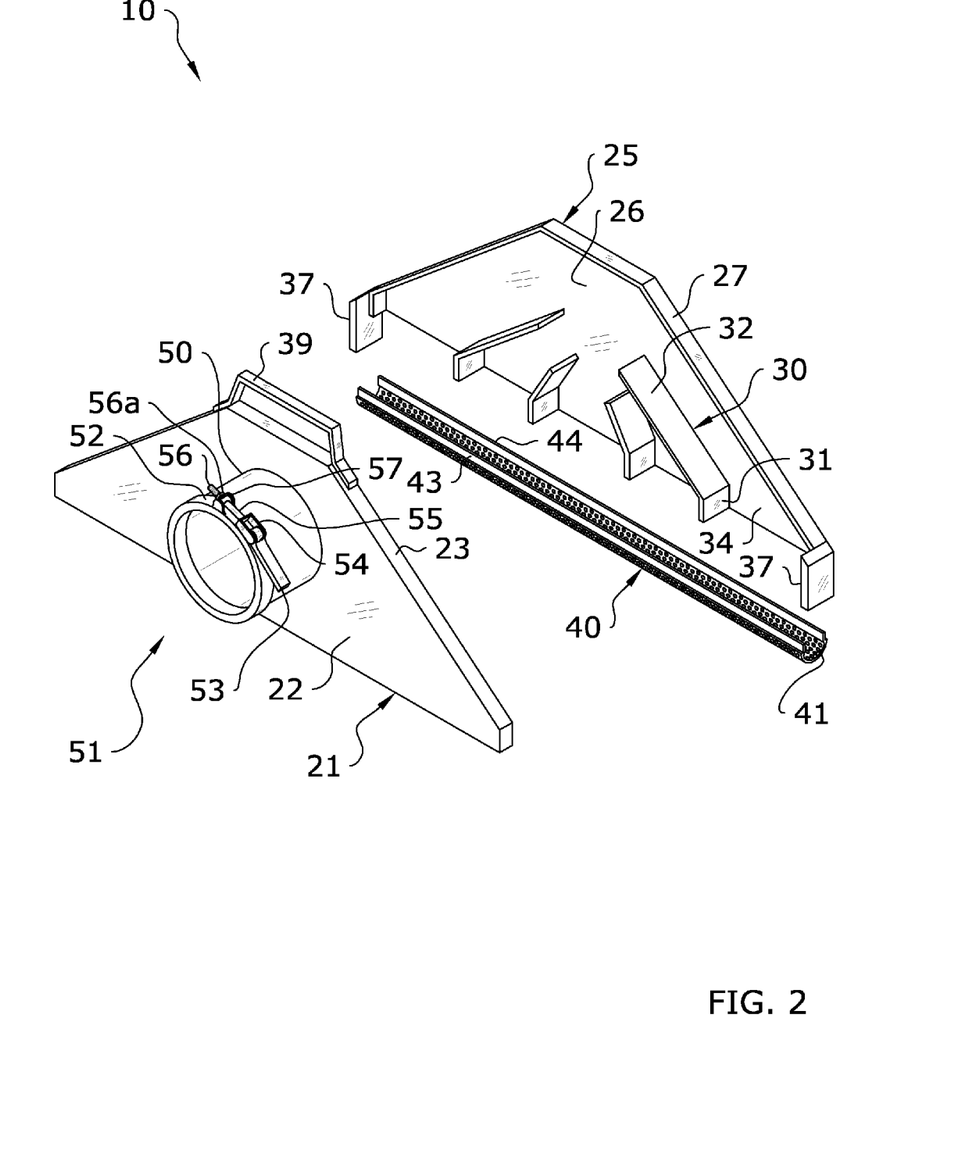
FIG. 2 is an exploded upper perspective view of the strainer.

The strainer 10 generally comprises a water resistant and non corrosive body 20 formed from plastic, aluminum, or other suitable materials. The body 20 of the strainer 10 is of a triangular shape in a preferred embodiment, such that the bottom of the body 20 is elongated and substantially equal in length to the rest of the sides of the body 20. In a preferred embodiment, the body 20 includes a first side section 21 and a second side section 25. The first side section 21 and the second side section 25 may be integrally formed and permanently connected or the first side section 21 and the second side section 25 may be removably connected to each other as illustrated in FIG. 2.

Figure 5:
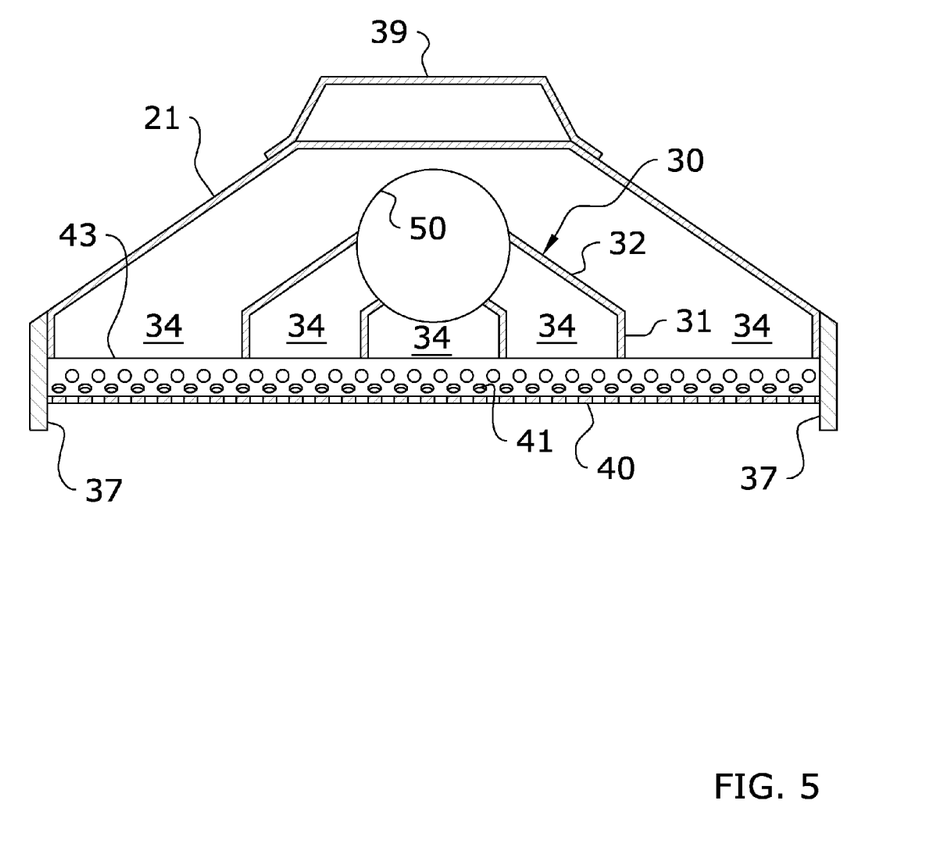
FIG. 5 is a side cross-sectional view of the strainer.

The first side section 21 generally includes a triangular-shaped front wall 22 having an opening 24 as illustrated in FIG. 5, generally centrally located thereon, and sidewalls 23 extending laterally from the peripheral edges of the front wall 22, except along the bottom of the front wall 22. The second side section 25 generally includes a triangular-shaped back wall 26 and sidewalls 27 extending laterally from the peripheral edges of the back wall 26, except along the bottom of the back wall 26. The sidewalls 23 of the front wall 22 and the sidewalls 27 of the back wall 26 meet to space the front wall 22 and back wall 26 from each other and thus form an interior space between thereof such as to permit for water flow.

Within the interior space of the body 20 is a plurality of guide vanes 30 to provide defined channels 34 for the water 12 to flow thus increasing water flow and reducing or eliminating a whirlpool effect within the holding tank 70 via the separate suction zones. The guide vanes 30 generally extend angularly upward from the bottom of the body 20 and lead to the opening 24 of the front wall 22 as best illustrated in FIGS. 2 and 5. In the preferred embodiment, the guide vanes 30 are connected to the back wall 26 of the second side section 25.

The guide vanes 30 are preferably evenly spaced along the bottom such as to define channels 34 between thereof comprised of similar widths as best illustrated in FIGS. 2 through 5. The length of the guide vanes 30 varies according to the distance from the respective location along the bottom to the opening 24. The width of each of the guide vanes 30 is preferably equal to the combined width of the sidewalls 23, 27 such as to extend across the entire interior space so that water 12 flowing within the interior space from the bottom is forced to travel within the channels 34 defined by the guide vanes 30. The preferred embodiment illustrates four guide vanes 30; however more or less guide vanes 30 may be used as deemed appropriate. Generally five channels 34 are formed with the guide vanes 30; however more or less channels 34 may be formed as desired.

The angled portion of the sidewalls 23, 27 of the triangular-shaped body 20 also provides means for directing the water 12 towards the outlet opening 24. The sidewalls 23, 27 are angled such as to substantially parallel at least a portion of one or more of the guide vanes 30 as illustrated in FIGS. 2 and 5. As illustrated in FIGS. 2 and 5, the guide vanes 30 generally include a vertical portion 31 and angled portion 32; however the guide vanes 30 may be entirely angled or vertical as appreciated.

The body 20 also generally includes an elevating means comprised of a plurality of foot members 37 that extend downward from the bottom of the first side section 21 and second side section 25 to elevate the first side section 21 and the second side section 25 above a floor of the holding tank 70 when the foot members 37 are resting thereon and the body 20 is supported in an upright position as best illustrated in FIG. 5. The upper end of the foot members 37 is connected to the body 20 and the lower end of the foot members 37 rests upon the floor of the holding tank 70 such as to elevate the bottom of the intake 40 slightly above the floor of the holding tank 70, such as but not limited to a 0.5 inch separation. The foot members 37 may be comprised of various materials, such as plastic, rubber, etc. In the preferred embodiment, a foot member 37 extends downwardly from each end of the bottom of the second side section 25. The foot members 37 are not sharp so as to prevent any puncturing of the holding tank 70.

Figure 1:
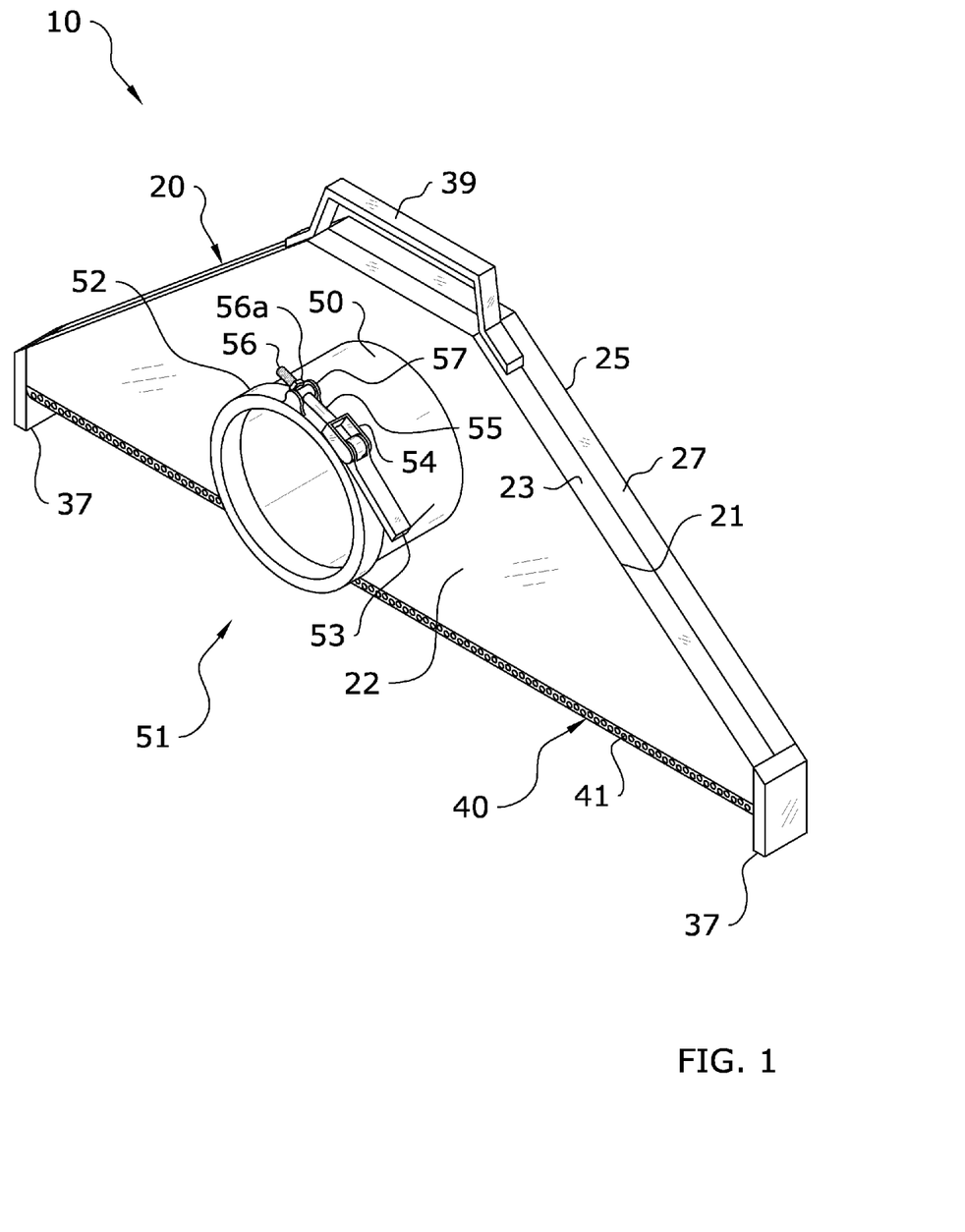
FIG. 1 is an upper perspective view of the strainer.

The body 20 also includes a handle 39 to permit for carrying and maneuverability of the strainer 10. The handle 39 generally extends upwardly from the body 20 and in the preferred embodiment extends upwardly from the first side section 21 as best illustrated in FIGS. 1, 2, and 5.

The intake 40 is attached along the entire elongated bottom of the body 20, thus making the intake 40 elongated as illustrated in FIGS. 1 through 5. The intake 40 is generally comprised of a screen structure and includes a plurality of openings 41 spaced throughout. The size of the openings 41 may be determined by the size of foreign particles that are desired to be restricted from entering the interior space of the body 20. The intake 40 generally includes a first lengthwise edge 43 that is affixed to the first side section 21 along the respective bottom and a second lengthwise edge 44 that is affixed to the second side section 25 along the respective bottom as illustrated in FIG. 2.

The intake 40 generally forms an arcuate shape and curves outwardly from the bottom of the body 20. The intake 40 is also generally elevated from the floor of the holding tank 70 via the foot members 37, wherein the foot members 37 extend below the intake 40 to permit for optimal water flow through the openings 41 of the intake 40 as illustrated in FIG. 5. It is appreciated that the arcuate shape of the intake 40 permits for water 12 to enter through the front, back, and bottom openings 41 of the intake 40. The intake 40 is also close to the floor of the tank 70 such as to permit for a majority or all of the water 12 within the tank 70 to be suctioned through the strainer 10.

The length of the intake 40 and thus bottom of the body 20 is preferably approximately 46 inches such as to provide water 12 flows of 1500+ gallons per minute; however various lengths may be appreciated.

Figure 10A:
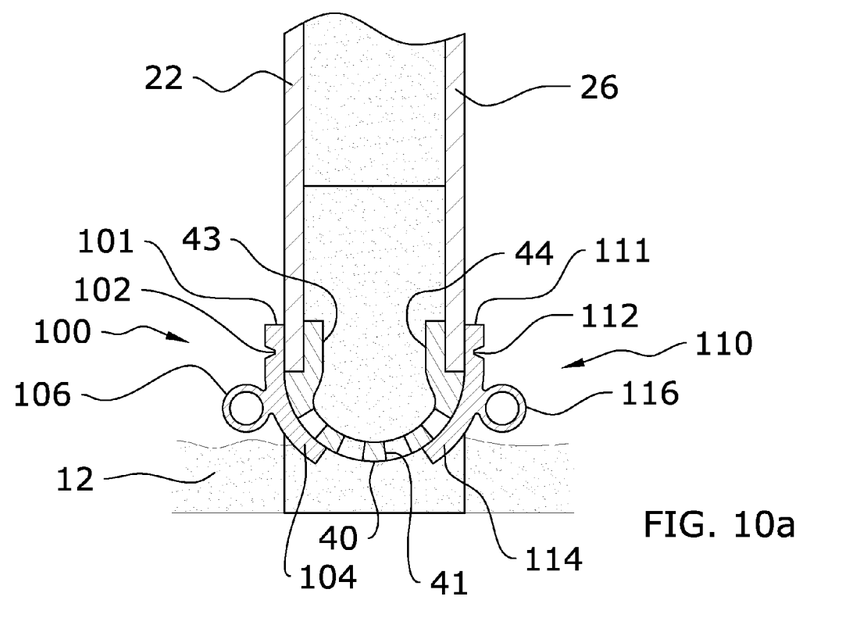
Figure 10B:
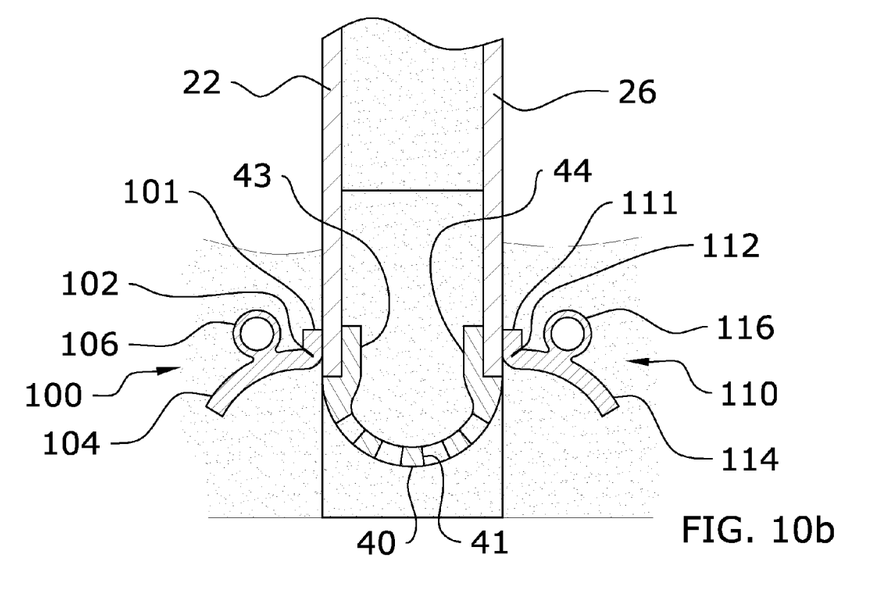

The present invention may optionally include first and second suction control blades 100, 110 to regulate water inflow when water levels drop below a portion of the exposed intake 40. Each suction control blade 100, 110 is attached to a respective front 22 or back 26 of the body 20 as illustrated in FIGS. 10a and 10b, generally via affixing an upper connecting strip 101, 111 of the control blade 100, 110 to the lower end of the respective front 22 or back 26 of the body 20 via adhesive or other substance or fastener. Pivotally connected to the connecting strip 101, 111 via a living hinge 102, 112 is an arcuate blade strip 104, 114 that is suited for flushly covering a portion of the exposed intake 40. Attached to an upper surface of the arcuate blade strip 104, 114 are flotation members 106, 116, comprised of hollow tubes having closed ends, which control the position of the pivotal blade strips 104, 114 depending upon the water level. Each suction control blade 100, 110 is also preferably formed of a santoprene material which permits for the living hinges 102, 112.

The radius of the molded blade strips 104, 114 will conform to the perforated intake 40, thus sealing off the intake 40 as it lowers with the water level. For example, when the water level is above 5", floatation created with the ¾" flotation members 106, 116 will raise the blade strips 104, 114 to the fully up and open position as illustrated in FIG. 10b. As water recedes down the tank 70 (E.g. to the last 4-5 inches), the blade strips 104, 114 will begin to lower because of the floatation members 106, 116 and close off half of the intake area of the intake 40 as illustrated in FIG. 10a. The closing of the blade strips 104, 114 permits water to be drafted down to within ¾" of the bottom of the tank 70. The intake 40, when the blade strips 104, 114 are fully down will only permit water flow through bottom ⅓ radius (for example) of the intake 40.

The outlet member 50 controls the output of the water 12 from the strainer 10. The outlet member 50 generally comprises a tubular structure extending from the opening 24 of the body 20 such as to attach a hose 67 directly or via a threaded coupler 64, such as wherein the threaded coupler 64 attaches to the outlet member 50. The outlet member 50 is preferably comprised of a rubber or plastic material and is connected to the exterior side of the first side section 21 around the opening 24.

A ring clamp 51 or cam lever clamp band may be supported around the exterior of the outlet member 50 for attaching the respective suction hose 67, threaded coupler 64, or other attachment mechanism. In the preferred embodiment the clamp structure 51 comprises a band 52 having a first end and an overlapping second end being arranged in a circular shape and movable with respect to each other to adjust the diameter of the band 52. Attached to one end of the band 52 is a pivotal handle 53. Extending from the pivotal handle 53 is a linkage element 54 which connects to an elongated rod 55. The elongated rod 55 has a threaded end 56 which extends past the second end of the band 52 and through a retainer 57 that is attached to the second end of the band 52. The threaded end 56 may be threadably attached to the retainer 57 such that as the handle 53 is pivoted downwards, the retainer 57 is pulled towards the handle 53 via the rod 55 such as to decrease a diameter of the band 52 and thus tighten the hose 67 upon the outlet member 50. In addition or alternately, a fastener nut 56a may be attached on an outer end of the threaded part 56 of the rod 55 which would in turn engage the retainer 57 and force the retainer 57 and second end of the band 52 towards the handle 53 to decrease the diameter of the band 52. When the handle 53 is pivoted to an open position, the second end of the band 52 is forced away from the handle 53 via the rod 55 such as to increase the diameter of the band 52 and permit removal of the hose 67 from the outlet member.

The strainer 10 also preferably includes a valve member 58 to control flow and aid in priming. The valve member 58 is preferably comprised of a check valve structure such as to permit water flow in a first direction but restrict water flow in a second direction. In the preferred embodiment, the valve member 58 is comprised of a rubber, circular structure sized to cover the opening 24 and supported along a center by a support 59.

Figure 3:
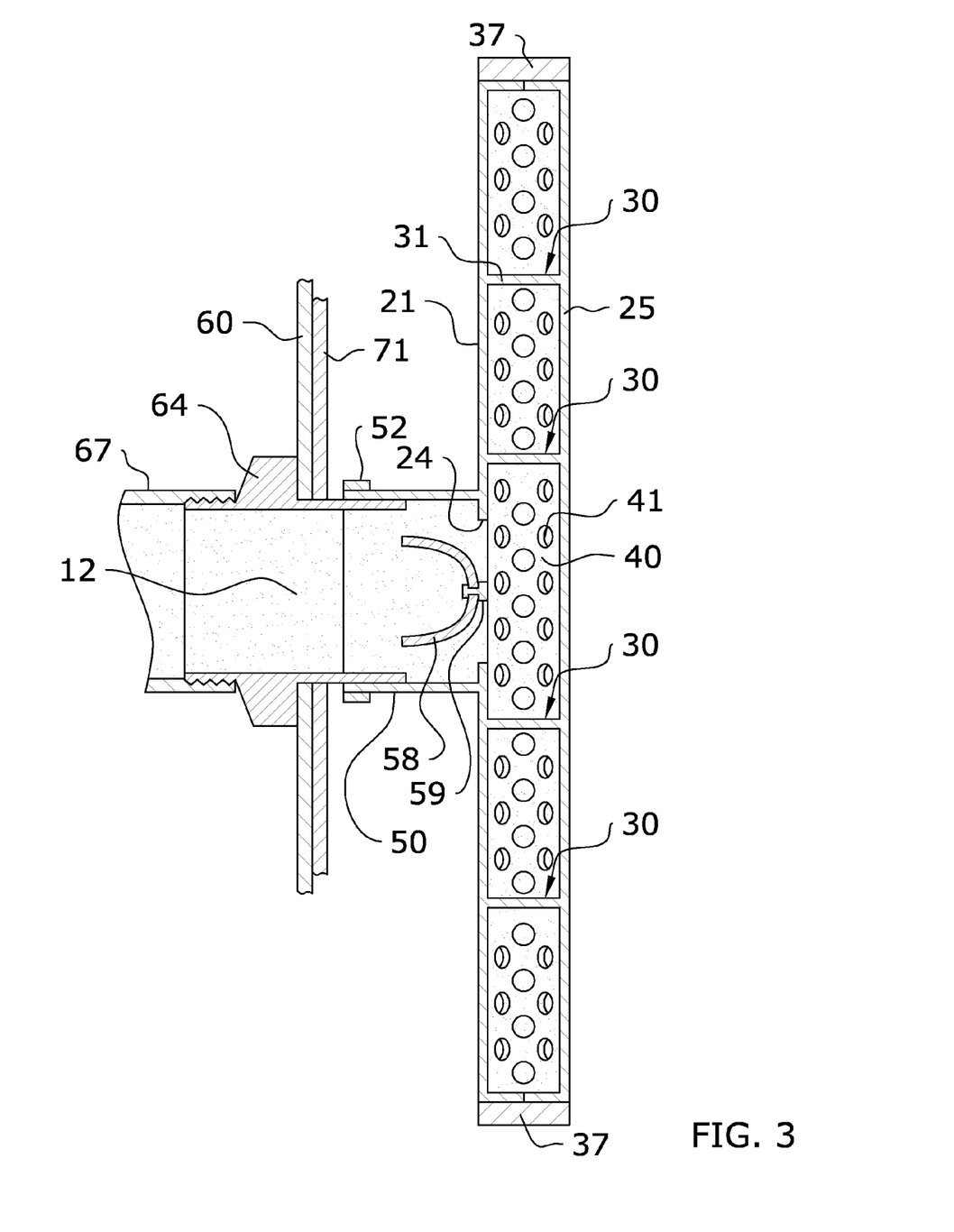
FIG. 3 is a top sectional view of the strainer attached to a hose and the check valve in the open position such as to permit water flow.
Figure 4:
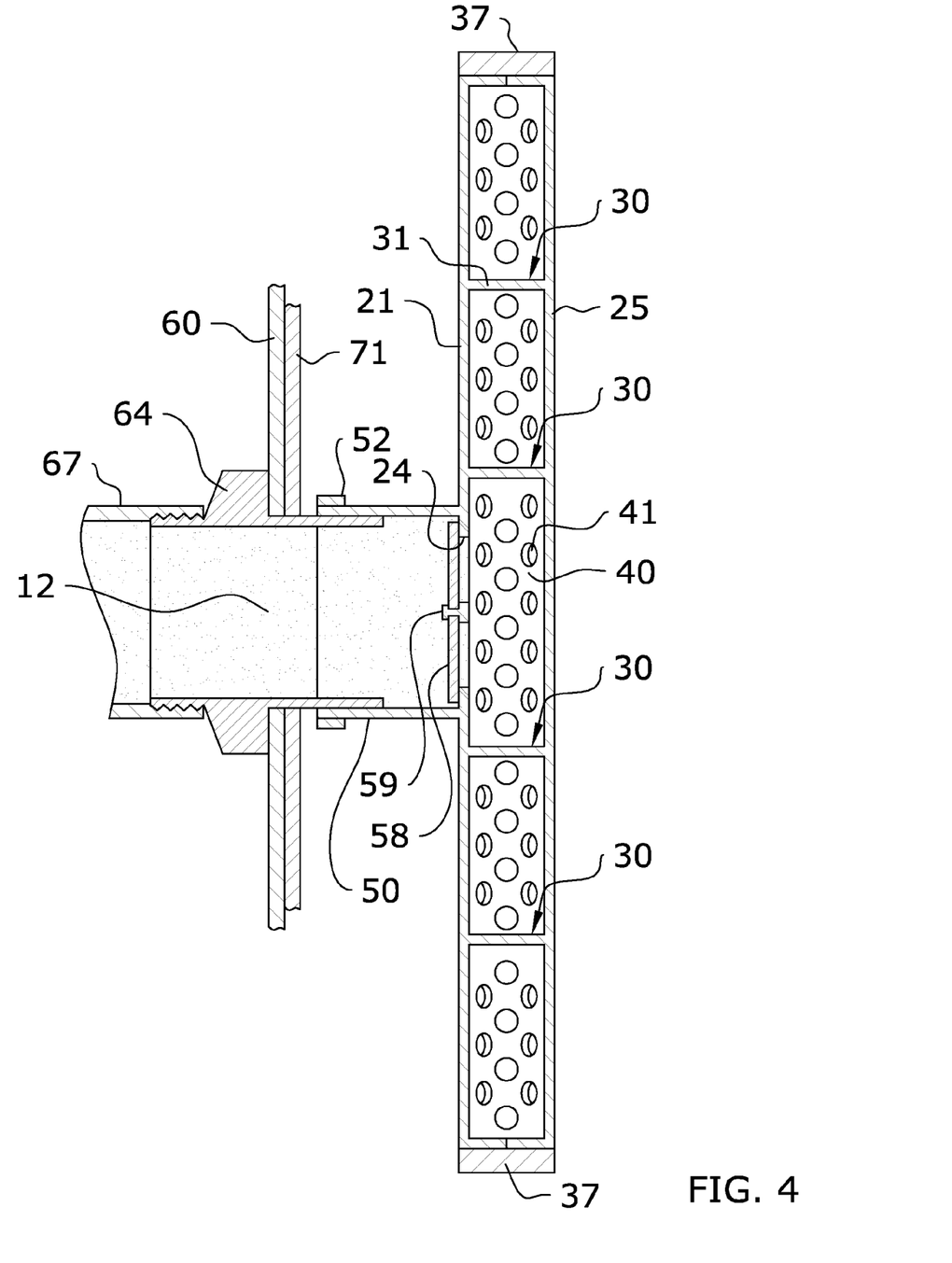
FIG. 4 is a top sectional view of the strainer attached to a hose and the check valve in the closed position such as to restrict water flow.

The valve member 58 is preferably supported upon an exterior side of the body 20 and has a diameter slightly larger than the opening 24. When water flows out of the body 20 through the opening 24, the valve member 58 bends or pivots forwardly thus permitting water 12 to flow therethrough to the hose 67 as illustrated in FIG. 3. If the water flow is reversed, the pressure of the water 12 upon the exterior side of the valve member 58 causes the peripheral edge of the valve member 58 to engage the exterior side of the front wall 22 around the opening 24 and thus block the opening 24 to restrict water 12 from flowing from the hose 67 to the interior space of the body 20 as illustrated in FIG. 4.

C. Submersed Attachment.

When being submersed within a holding tank 70, the strainer 10 is preferably positioned in an upright manner near a sidewall of the holding tank 70 so that the foot members 37 engage the floor and the intake 40 is elevated from the floor. An opening is formed in the sidewall of the holding tank 70 and the outlet member 50 is extended through. Various gaskets or sealing compounds may be used to ensure that no leaking occurs. A support plate 60 having an opening is attached to the strainer 10 for securing the strainer 10 to a frame 73 of the holding tank 70. The opening of the support plate 60 receives the outlet member 50, wherein the support plate 60 is positioned on an exterior side of the holding tank 70 and the support plate 60 is affixed to the metal frame 73 of the holding tank 70 as illustrated in FIG. 6.

It is appreciated that the sidewalls 71 of the holding tank 70 are generally of a fabric or plastic material and thus attachment thereto may cause too much stress to be placed upon the holding tank 70 or cause ripping or tearing of the holding tank 70. Thus, attachment to the frame 73 which supports the holding tank 70 is preferred. Various types of fasteners may be used to fixedly or removably connect the support plate 60 to the frame 73. Additionally, a threaded coupler 64 may be secured to the outlet member 50 such that the threaded portion of the coupler 64 extends outwardly from the holding tank 70 to permit easy access thereto for connecting and disconnecting a suction hose 67, such as a fire hose such as illustrated in FIGS. 3 and 4.

It is appreciated that when mounted to the sidewall 71 of the tank 70, the strainer 10 is out of the way of dump wash and is also affixed to the frame of the tank 70 so it cannot move. Prior art strainers are often dislodged when arriving trucks dump their load of water 12 into the tank 70. Also by mounting the strainer 10 directly to the tank 70, a riser effect or air entrapment of prior art strainers that simply extend over the sidewalls 71 of the tank 70 is eliminated. The strainer 10 can be attached to new tanks or retrofitted to existing tanks D. Skimmer Attachment.

FIG. 7 illustrates an alternate embodiment of the present invention and more particularly a skimming assembly 80. In the alternate use or configuration of the present invention, multiple strainers 10 may be connected inline along a frame 81, wherein one or more flotation members 85 are attached to the ends of the frame 81 or along the frame 81 for retaining the frame 81 and plurality of strainers 10 along the surface of a body of water 89. Outlet hoses 67 are connected to the strainers 10 for outputting water or other substance (E.g. oil or gas) received by the strainers 10. A tow rope 87 or other pulling structure is generally attached to the frame 81 or flotation members 85 for pulling the skimming assembly 80 in a first direction, wherein the outlet hoses 67 extend in a second direction. The strainers 10 are generally comprised of a similar structure as previously described.

When used for the purpose of "skimming" the strainer 10 would be positioned horizontal to the water surface with the suction hose 67 rising vertically up out of the strainer 10. Since the check valve 58 is installed adjacent to the strainer 10 wall, drain back of siphoned liquids is virtually eliminated.

E. Flotation Attachment.

FIG. 8 illustrates another alternate embodiment of the present invention. The embodiment includes a flotation member 90 adapted to attach to the strainer 10. The flotation member 90 may be comprised of various materials, such as but not limited to foam or another buoyant material. The flotation member 90 includes an upper opening 91 for receiving the handle 39 of the strainer 10 and includes a recess 93 along the side of the flotation member 90 for receiving the outlet member 50 of the strainer 10 and/or hose 67. The flotation member 90 keeps the strainer 10 along the surface of the water 99 so that the intake 40 is just below the surface of the water 99 and also retains the strainer 10 in an upright orientation.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. An intake for a hose, comprising:
   a body having a front wall, a back wall, sidewalls, and an elongated open bottom;
   wherein said body has an interior space defined between said front wall, said back wall, said sidewalls, and said open bottom, and wherein said front wall has an opening connecting with said interior space;
   a plurality of guide vanes located within said interior space of said body between said front wall and said back wall, said guide vanes being adapted to direct fluids from said open bottom to said opening of said front wall, wherein each of said guide vanes includes a vertical portion and an angled portion, wherein said vertical portion of each of said guide vanes extends from said open bottom of said body, wherein said angled portion of each of said guide vanes extends inwardly from one of said sidewalls;
   wherein said plurality of guide vanes define a plurality of channels, said plurality of channels are directed from said open bottom to said opening of said front wall; and
   a connecting means extending from said opening of said front wall adapted to connect to a hose and receive water from said interior space of said body.

2. The intake for a hose of claim 1, wherein said body is comprised of a triangular shape.

3. The intake for a hose of claim 2, wherein said sidewalls of said body are angled such as to be substantially parallel to one or more of said plurality of guide vanes.

4. The intake for a hose of claim 1, wherein said plurality of guide vanes are equidistantly spaced along said open bottom.

5. The intake for a hose of claim 1, wherein said connecting means comprises:
   a tubular outlet member extending from said front wall; and
   a ring clamp positioned around said tubular outlet member.

6. The intake for a hose of claim 5, including a threaded coupler adapted to attach to said tubular outlet member via said ring clamp.

7. The intake for a hose of claim 6, wherein said ring clamp includes a pivotal handle and a linkage element which connects to an elongated rod, wherein an end of said ring clamp includes a retainer, wherein said elongated rod includes a threaded end extending through said retainer, wherein said threaded end is threadably attached to said retainer such that as said handle is pivoted downwards, said ring clamp tightens around said tubular outlet member.

8. The intake for a hose of claim 1, including an intake screen connected to said body and covering said open bottom, said intake screen being elongated.

9. The intake for a hose of claim 8, including at least one control blade connected to said body and adapted for restricting water flow through at least a portion of said intake screen.

10. The intake for a hose of claim 9, wherein said at least one control blade includes an arcuate blade strip adapted for being positioned against an exterior of said intake screen in a flush manner.

11. The intake for a hose of claim 10, wherein said arcuate blade strip pivotally adjusts from an upward position in which water is permitted to flow through said at least a portion of said intake screen to a downward position in which water is restricted from flowing through said at least a portion of said intake screen.

12. The intake for a hose of claim 11, wherein said at least one control blade includes a flotation member, said flotation member being attached to an upper surface of said arcuate blade strip for controlling pivotal adjustment of said arcuate blade strip depending upon a water level.

13. The intake for a hose of claim 1, including an elevating means having a lower end and an upper end, wherein said lower end of said elevating means is adapted to rest upon a floor of a holding tank and wherein said upper end of said elevating means is connected to said body such as to elevate said open bottom of said body.

14. The intake for a hose of claim 13, wherein said elevating means is comprised of a plurality of foot members extending downwardly from opposing ends of said body.

15. The intake for a hose of claim 1, including a check valve connected to said body and in operation with said opening of said front wall such as to permit water flow in a first direction and to restrict water flow in a second direction.

16. The intake for a hose of claim 15, wherein said check valve is comprised of a flexible, circular shaped structure.

17. The intake for a hose of claim 1, including a handle extending from said body.

18. An intake strainer for a hose, comprising:
   a body having a front wall, a back wall, sidewalls, and an elongated open bottom;

wherein said body has an interior space defined between said front wall, said back wall, said sidewalls, and said open bottom, and wherein said front wall has an opening connecting with said interior space;

wherein said body is comprised of a triangular shape;

a plurality of guide vanes located within said interior space of said body between said front wall and said back wall, said guide vanes being adapted to direct fluids from said open bottom to said opening of said front wall;

wherein said plurality of guide vanes define a plurality of channels, said plurality of channels are directed from said open bottom to said opening of said front wall;

wherein said sidewalls of said body are angled such as to substantially parallel one or more of said plurality of guide vanes;

wherein said plurality of guide vanes are equidistantly spaced along said open bottom;

wherein said plurality of guide vanes each include a vertical portion and an angled portion extending therefrom, wherein said vertical portion of each of said guide vanes extends from said open bottom of said body, wherein said angled portion of each of said guide vanes extends inwardly from one of said sidewalls;

an intake screen connected to said body and covering said open bottom, said intake screen being elongated;

a check valve connected to said body and in operation with said opening of said front wall such as to permit water flow in a first direction and to restrict water flow in a second direction;

wherein said check valve is comprised of a flexible, circular shaped structure;

a handle extending from said body; and a connecting means extending from said opening of said front wall adapted to connect to a hose and receive water from said interior space of said body;

wherein said connecting means comprises a tubular outlet member extending from said front wall and a ring clamp positioned around said tubular outlet member.

* * * * *